United States Patent
Misaki et al.

(10) Patent No.: US 10,119,608 B2
(45) Date of Patent: Nov. 6, 2018

(54) GREASE APPLICATION METHOD, APPLICATION DEVICE, AND METHODS FOR MANUFACTURING WORM-TYPE REDUCER, ELECTRIC POWER STEERING DEVICE, AUTOMOBILE AND VARIETY OF INDUSTRIAL MACHINES

(71) Applicant: NSK LTD., Tokyo (JP)

(72) Inventors: Kei Misaki, Fujisawa (JP); Shunsuke Ochi, Fujisawa (JP); Satoshi Araki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/548,865

(22) PCT Filed: Feb. 22, 2016

(86) PCT No.: PCT/JP2016/055077
§ 371 (c)(1),
(2) Date: Aug. 4, 2017

(87) PCT Pub. No.: WO2016/140095
PCT Pub. Date: Sep. 9, 2016

(65) Prior Publication Data
US 2018/0045296 A1    Feb. 15, 2018

(30) Foreign Application Priority Data
Mar. 2, 2015    (JP) .................. 2015-039863

(51) Int. Cl.
*F16H 57/04*    (2010.01)
*F16N 11/08*    (2006.01)
(Continued)

(52) U.S. Cl.
CPC ....... *F16H 57/0464* (2013.01); *B05B 7/1263* (2013.01); *B05B 12/06* (2013.01);
(Continued)

(58) Field of Classification Search
CPC ....... F16H 57/0464; B05B 1/26; F16N 11/08; F16N 7/18
See application file for complete search history.

(56) References Cited

U.S. PATENT DOCUMENTS 2,017,871 A * 10/1935 Strain ................. F16H 57/0463
184/109
2,220,301 A * 11/1940 Terry ........................ F16N 7/34
184/55.2
(Continued)

FOREIGN PATENT DOCUMENTS

DE    102006013865 A1    9/2007
JP    60-104276 U    7/1985
(Continued)

OTHER PUBLICATIONS

Int. Search Report dated May 24, 2016 issued by the Int. Searching Authority in Application No. PCT/JP2016/055077 (PCT/ISA/210).
(Continued)

*Primary Examiner* — Michael R Mansen
*Assistant Examiner* — Mark K Buse
(74) *Attorney, Agent, or Firm* — Sughrue Mion, PLLC

(57) ABSTRACT

The present invention relates to a grease application device in which a tip-side inclined surface of a nozzle 28 is made to closely face worm wheel teeth 11 of a shaft-mounted worm wheel 9 while rotating the shaft-mounted worm wheel 9 by means of a drive unit 12. At this state, the grease application device is configured to apply liquid grease from a tip-side opening of the nozzle 28 to the worm wheel teeth 11 of the shaft-mounted worm wheel 9 and to apply the grease while pushing the grease into concave portions of the worm wheel teeth 11. Also, the grease application device is configured to end the application of the grease at a point of time at which the shaft-mounted worm wheel has rotated (Continued)

one revolution with respect to the nozzle 28 after starting the application of the grease to the shaft-mounted worm wheel 9.

13 Claims, 3 Drawing Sheets

(51) Int. Cl.
    *B05B 12/06*     (2006.01)
    *F16N 7/18*     (2006.01)
    *F16N 7/14*     (2006.01)
    *B05B 7/12*     (2006.01)
    *B05B 13/02*     (2006.01)
    *F16H 57/12*     (2006.01)
    *F16N 7/38*     (2006.01)
    *B05D 1/26*     (2006.01)
    *F16H 1/16*     (2006.01)
    *F16N 3/10*     (2006.01)

(52) U.S. Cl.
    CPC ......... *B05B 13/0228* (2013.01); *F16H 57/04* (2013.01); *F16H 57/0431* (2013.01); *F16H 57/0456* (2013.01); *F16H 57/12* (2013.01); *F16N 7/14* (2013.01); *F16N 7/18* (2013.01); *F16N 7/385* (2013.01); *F16N 11/08* (2013.01); *B05D 1/26* (2013.01); *F16H 1/166* (2013.01); *F16N 3/10* (2013.01); *F16N 2270/30* (2013.01)

(56) References Cited

U.S. PATENT DOCUMENTS

| | | | | |
|---|---|---|---|---|
| 2,235,258 A * | 3/1941 | Jones | ........................ | B05B 1/14 169/37 |
| 4,815,637 A * | 3/1989 | Nellis | ........................ | B62J 31/00 184/15.1 |
| 4,901,679 A * | 2/1990 | Hodgkins | ........................ | F01P 3/08 123/41.35 |
| 5,878,632 A * | 3/1999 | Hubler | ........................ | F04C 2/102 184/6.12 |
| 5,890,661 A * | 4/1999 | Crampton | ........................ | B05B 1/26 239/333 |
| 6,113,013 A * | 9/2000 | Sand | ........................ | B05B 7/0846 239/543 |
| 6,199,465 B1 * | 3/2001 | Hattori | ........................ | B05B 7/0012 184/55.1 |
| 6,659,370 B1 * | 12/2003 | Inoue | ........................ | B05B 7/0012 239/419.5 |
| 7,219,849 B1 * | 5/2007 | Hedger | ........................ | B05B 1/26 239/543 |
| 7,264,179 B2 * | 9/2007 | Robbins | ........................ | B81C 1/00674 184/6.26 |
| 7,438,659 B2 * | 10/2008 | Kim | ........................ | F16H 57/0489 184/15.2 |
| 7,699,932 B2 * | 4/2010 | Miller | ........................ | C23C 16/45544 118/715 |
| 7,832,937 B2 * | 11/2010 | Suzuki | ........................ | F16C 33/6674 184/11.2 |
| 2005/0252722 A1 * | 11/2005 | Kosugi | ........................ | B23Q 11/122 184/5.1 |
| 2006/0204360 A1 * | 9/2006 | Hinz | ........................ | F03D 7/0224 415/175 |
| 2006/0283667 A1 * | 12/2006 | Piana | ........................ | B23Q 11/1076 184/6.14 |
| 2008/0149424 A1 * | 6/2008 | Chen | ........................ | F16N 21/02 184/105.3 |
| 2008/0219781 A1 * | 9/2008 | Hyatt | ........................ | B24B 5/02 407/11 |
| 2008/0264542 A1 * | 10/2008 | Hawkins | ........................ | B29D 30/0662 152/510 |
| 2008/0311010 A1 * | 12/2008 | Boe | ........................ | B05B 1/08 422/172 |
| 2012/0211322 A1 | 8/2012 | Kasuya et al. | | |
| 2014/0054114 A1 | 2/2014 | Isomura et al. | | |

FOREIGN PATENT DOCUMENTS

| | | |
|---|---|---|
| JP | 2010-269892 A | 12/2010 |
| JP | 2012-172798 A | 9/2012 |
| JP | 2012-217952 A | 11/2012 |
| JP | 2012-237352 A | 12/2012 |
| WO | 2012/144035 A1 | 10/2012 |

OTHER PUBLICATIONS

Written Opinion dated May 24, 2016 issued by the Int. Searching Authority in Application No. PCT/JP2016/055077 (PCT/ISA/237).
Communication dated Mar. 21, 2018, from the European Patent Office in counterpart European Application No. 16758789.8.

\* cited by examiner

GREASE APPLICATION METHOD, APPLICATION DEVICE, AND METHODS FOR MANUFACTURING WORM-TYPE REDUCER, ELECTRIC POWER STEERING DEVICE, AUTOMOBILE AND VARIETY OF INDUSTRIAL MACHINES

TECHNICAL FIELD

The present invention relates to improvements on a grease application method and a grease application device.

RELATED ART

Many gears are incorporated in a power transmission part of an automobile and a variety of industrial machines, and meshing portions between the gears are lubricated by grease. Specifically, for example, meshing portions between worm teeth of a worm shaft and worm wheel teeth of a worm wheel configuring a worm-type reducer to be incorporated in an electric power steering device are lubricated by grease.

The worm shaft and the worm wheel are mounted to each other at a state where the grease is applied to at least one of the worm teeth and the worm wheel teeth. Patent Document 1 discloses a grease application device configured to apply grease to a tooth part of a gear part such as the worm teeth, the worm wheel teeth or the like. In the below, a structure of the grease application device 1 disclosed in Patent Document 1 is simply described with reference to FIG. 3.

The grease application device 1 is to apply grease (not shown) to a tooth part formed on an outer peripheral surface of a gear 2, which is a member to be applied, and includes a grease pump 3, a continuous flow valve 4 and a grease spray-application gun 5.

The grease pump 3 is configured to deliver (pneumatically transport) the grease stored in a grease receptacle 6 to the continuous flow valve 4 through a hose 7a.

The continuous flow valve 4 is configured to adjust a flow rate and a flow velocity of the grease pneumatically transported from the grease pump 3 and then to deliver the grease to the grease spray-application gun 5 through a hose 7b.

The grease spray-application gun 5 is configured to include the grease delivered from the continuous flow valve 4 into a flow of a compressed air delivered from a compressed air source 8 through a hose 7c, to form the grease into a spray state and to apply the same to the tooth part of the gear 2.

According to the grease application device 1 configured as described above, it is possible to substantially uniformly apply the thinly extending grease to a surface of the tooth part of the gear 2. However, since the grease is at a spray state, it is necessary to repeatedly perform the application operation so as to uniformly the grease having a predetermined amount or greater. Also, it is difficult to apply a sufficient amount of the grease to the surface of the tooth part of the gear 2 (particularly, tooth bottom portions of the tooth part of the gear 2) in a short time (for example, while the gear 2 rotates one revolution).

CITATION LIST

Patent Documents

Patent Document 1: Japanese Patent Application Publication No. 2012-217952A

SUMMARY OF THE INVENTION

Problems to be Solved

The present invention has been made in view of the above situations, and an object thereof is to implement a grease application method and a grease application device capable of applying a sufficient amount of grease to a concave-convex part formed on a circumferential surface of a member to be applied with a small number of revolutions.

Means for Solving Problems

A grease application device of the present invention includes a drive unit and a nozzle.

The drive unit is to rotatively drive a member to be applied.

The nozzle is arranged with an opening thereof being close to a concave-convex part formed on a circumferential surface of the member to be applied, and is to apply grease, which is to be discharged from the opening, to the concave-convex part.

Particularly, in the grease application device of the present invention, the grease is applied from the nozzle to the member to be applied, as a fluid of liquid or gel phase (a phase that is not mist).

The nozzle can apply the grease to the concave-convex part while pushing the grease into concave portions of the concave-convex part.

When implementing the grease application device of the present invention, additionally, a tip portion of the nozzle is formed with an inclined surface inclined relative to a central axis of the nozzle by a predetermined angle, and the opening of the nozzle is made to open towards the inclined surface. The grease can be applied at a state where the opening closely faces the concave-convex part.

Also, when implementing the grease application device of the present invention, additionally, a function of ending the application of the grease at a point of time at which the member to be applied has rotated one revolution with respect to the nozzle after starting the application of the grease to the member to be applied may be provided.

Also, when implementing the grease application device of the present invention, additionally, a detection function of detecting a rotation position (a circumferential position of the concave-convex part) of the member to be applied may be provided.

Also, a function of adjusting an amount of the grease to be applied to a rotation position of the member to be applied detected by the detection function, in correspondence to the rotation position, may be provided.

A grease application method of the present invention is a grease application method of while rotating a member to be applied having a concave-convex part formed on a circumferential surface thereof, applying grease, which is to be discharged from an opening of a nozzle arranged near the concave-convex part, to the concave-convex part, and can be implemented using the above-described grease application device of the present invention.

Particularly, in the grease application method of the present invention, the grease, which is a fluid of liquid or gel phase, is applied to the concave-convex part by the nozzle while pushing the grease into bottom portions of concave portions of the concave-convex part.

When implementing the grease application method of the present invention, additionally, the application of the grease is ended at a point of time at which the member to be applied has rotated one revolution with respect to the nozzle after starting the application of the grease to the concave-convex part of the member to be applied.

Also, when implementing the grease application method of the present invention, additionally, a tip portion of the nozzle may be formed with an inclined surface inclined relative to a central axis of the nozzle by a predetermined angle, and the opening of the nozzle may be made to open towards the inclined surface. Then, the grease may be applied at a state where the opening closely faces the concave-convex part.

Also, when implementing the grease application method of the present invention, specifically, the nozzle may be mounted so that an inclination direction of the inclined surface is parallel with a tangential direction of a tooth tip circle passing tip portions of convex portions of the concave-convex part of the member to be applied.

When implementing the grease application method of the present invention, additionally, a rotation position of the member to be applied may be detected after starting the application of the grease, and an amount of the grease corresponding to the rotation position of the member to be applied may be applied.

When implementing the grease application method of the present invention, specifically, the amount of the grease corresponding to the rotation position of the member to be applied may be applied by changing a rotating speed of the member to be applied while constantly keeping an amount of the grease to be discharged from the opening of the nozzle.

Upon implementation of the grease application method of the present invention, specifically, when the concave portions of the concave-convex part of the member to be applied face the opening of the nozzle, the grease may be filled in the concave portions by slowing down the rotating speed of the member to be applied.

Effects of the Invention

According to the grease application device of the present invention, since the grease, which is a fluid of liquid or gel phase, is applied by the nozzle, even when the number of rotations of the member to be applied is small (for example, while the member to be applied rotates one revolution), it is possible to apply the grease to the concave-convex part while pushing the grease into the concave portions of the concave-convex part of the member to be applied. For this reason, it is possible to apply a sufficient amount of the grease to the concave-convex part formed on the circumferential surface of the member to be applied in a short time.

Also, according to the grease application method of the present invention, it is possible to apply an appropriate amount of the grease corresponding to the rotation position of the member to be applied in a short time.

DETAILED DESCRIPTION OF EMBODIMENTS

Figure 1:
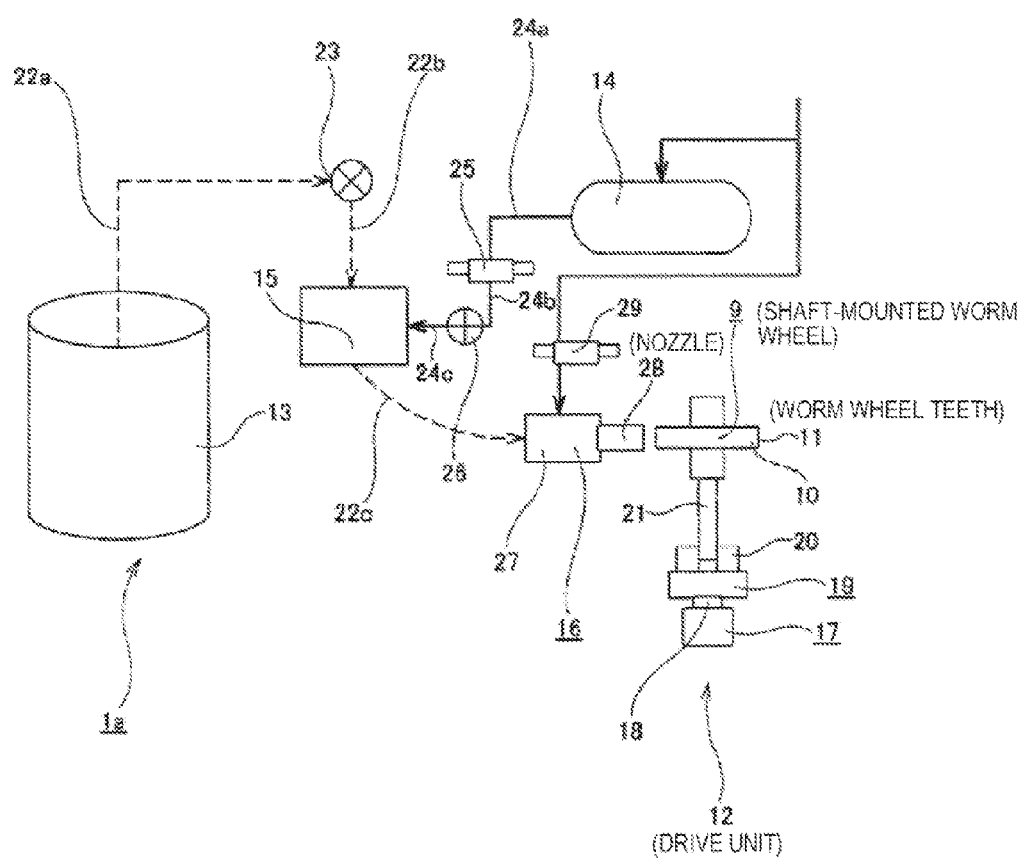
FIG. 1 is a pictorial view for illustrating a structure of a grease application device in accordance with an example of an embodiment of the present invention.
Figure 2:
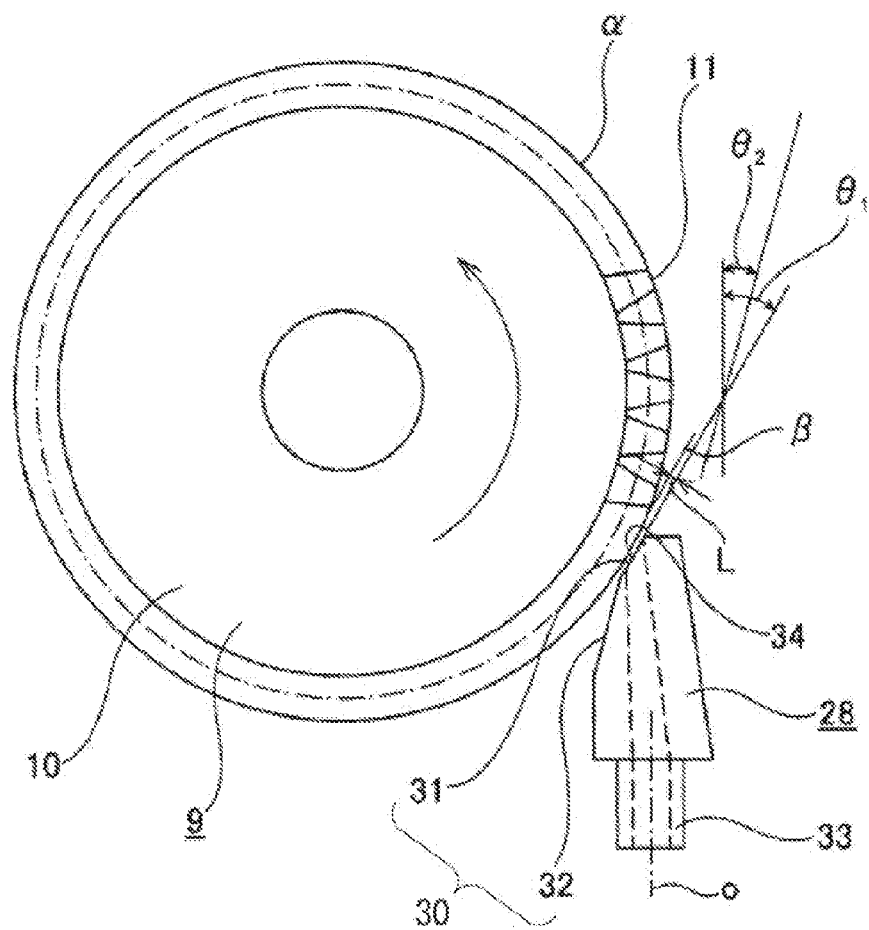
FIG. 2 is a pictorial view for illustrating a structure of a nozzle and an arrangement aspect of the nozzle to a member to be applied.
Figure 3:
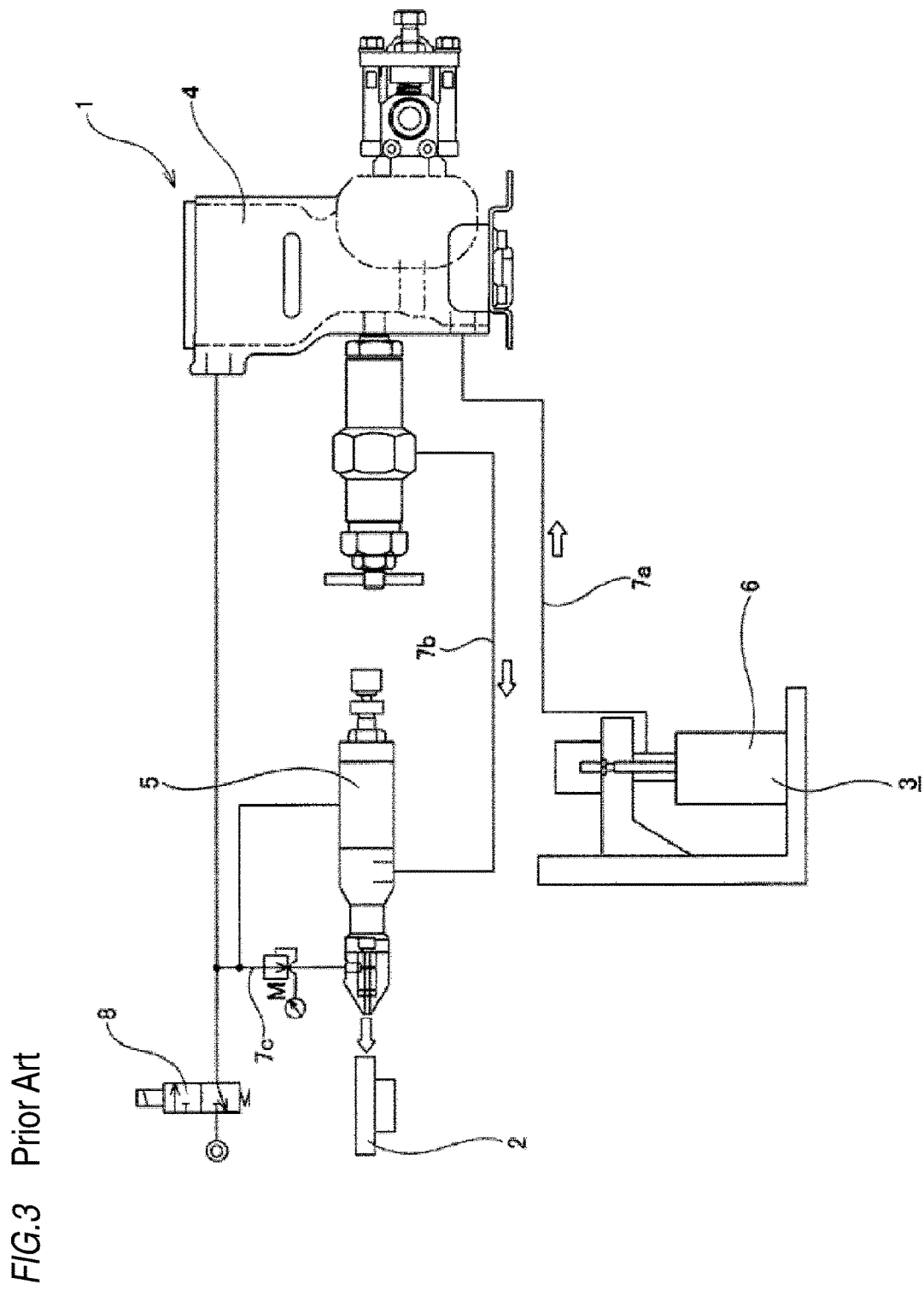
FIG. 3 illustrates a structure of a grease application device of the related art.

An example of an embodiment of the present invention will be described with reference to FIGS. 1 and 2. A grease application device 1a of the example is to apply grease to worm wheel teeth (a concave-convex part) 11 formed on a circumferential surface of a worm wheel 10 configuring a shaft-mounted worm wheel 9 corresponding to the member to be applied of the claims, and includes a drive unit 12, a grease pump 13, an air tank 14, a continuous flow valve 15 and a grease application unit 16.

The drive unit 12 includes a servo motor 17 and a chuck 19 fixedly coupled to a tip portion of an output shaft 18 of the servo motor 17. The drive unit 12 can rotatively drive the shaft-mounted worm wheel 9 with an end portion (a lower end portion in FIG. 1) of a shaft member 21 of the shaft-mounted worm wheel 9 being gripped by a gripping part 20 of the chuck 19.

The grease pump 13 is configured to supply grease (not shown) stored in a tank (not shown) to the continuous flow valve 15 (which will be described later) by a pump (not shown). Specifically, the grease delivered from the grease pump 13 is supplied to the continuous flow valve 15 through a path of a hose for grease 22a→a decompression valve 23→a hose for grease 22b. A decompression valve 23 is configured to adjust (decompress) a pressure of the grease supplied from the grease pump 13 and to deliver the same to the hose for grease 22b. In FIG. 1, the path of the grease is denoted with a broken line and a path of air (which will be described later) is denoted with a solid line.

The air tank 14 is configured to supply compressed air to the continuous flow valve 15. Specifically, the air compressed in the air tank 14 is supplied to the continuous flow valve 15 through a path of a hose for air 24a→a first electromagnetic valve 25→a hose for air 24b→a speed regulation valve 26→a hose for air 24c. The first electromagnetic valve 25 can switch ON/OFF states of the continuous flow valve 15 by switching ON/OFF states of the first electromagnetic valve 25. Specifically, when the first electromagnetic valve 25 is at an ON state, it is possible to advance a piston configuring the continuous flow valve 15. On the other hand, when the first electromagnetic valve 25 is at an OFF state, it is possible to retreat the piston configuring the continuous flow valve 15. Also, the speed regulation valve 26 is configured to control an operating speed of the continuous flow valve 15 (an advancing speed of the piston, a delivery speed of the grease) by controlling a flow velocity, a flow rate and the like of the air to be sent to the continuous flow valve 15.

As the continuous flow valve 15, a valve having a cylinder for air (not shown), a space for grease demarcated from the cylinder for air and a piston fitted in a cylindrical space consisting of the cylinder for air and the space for grease can be used. The grease is supplied from the grease pump 13 to the space for grease of the continuous flow valve 15. In the meantime, the air is supplied from the air tank 14 to the cylinder for air of the continuous flow valve 15. When the air is supplied into the cylinder for air, the piston is advanced and the grease is delivered from a protrusion port of the continuous flow valve 15 to the hose for grease 22c. In the example, the continuous flow valve 15 is provided with a moving start detection function for detecting an the start of the advance of the piston and a moving end detection function for detecting the end of the advance of the piston. The corresponding functions can be implemented by means of sensors and the like (not shown), for example. The information detected by the moving start detection function and the moving end detection function can be used to control the first electromagnetic valve 25 and a second electromagnetic valve 29 (which will be described later).

As described above, the ON/OFF states of the first electromagnetic valve 25 are switched to switch the ON/OFF states of the air supply to the cylinder for air of the continuous flow valve 15. Therefore, the delivery of the grease from the continuous flow valve 15 starts upon switching of the first electromagnetic valve 25 to the ON state and stops upon switching to the OFF state. Also, it is possible to adjust an advancing speed of the piston (a delivery amount of the grease) by controlling a flow rate, a flow velocity and the like of the air to be supplied to the cylinder for air with the speed regulation valve 26. However, when a pressure in the cylinder for air is low, even though the first electromagnetic valve 25 is switched to the ON state, the piston is not advanced until the pressure in the cylinder for air sufficiently increases. Therefore, when the pressure in the cylinder for air is not sufficiently high, a time lag may occur after the first electromagnetic valve 25 is switched to the ON state until the piston of the continuous flow valve 15 starts to advance.

The grease application unit 16 includes an opening and closing valve 27 and a nozzle 28.

The opening and closing valve 27 is switched between ON/OFF states (release/closed states) as the ON/OFF states of the second electromagnetic valve 29 are switched. When the opening and closing valve 27 is at the ON state (a release state and the second electromagnetic valve 29 is at the ON state), it is possible to supply the grease supplied from the continuous flow valve 15 to the nozzle 28. On the other hand, when the opening and closing valve 27 is at the OFF state (a closed state and the second electromagnetic valve 29 is at the OFF state), the supply of the grease to the nozzle 28 is stopped.

The nozzle 28 is a cylindrical member. An inclined part 30 having a flat surface shape that is inclined to the other side (a right side in FIG. 2) as it faces towards a tip-side is formed at a circumferential part (a half part of the worm wheel 9-side in FIG. 2) of a tip portion (an upper end portion in FIG. 2) of the nozzle 28. Specifically, the inclined part 30 has a tip-side inclined part 31 formed at a tip portion and a portion close to the tip and a base end-side inclined part 32 formed at a portion closer to a base end-side than the tip-side inclined part. An inclination angle $\theta 1$ of the tip-side inclined part 31 relative to a central axis O of a base part 33 of the nozzle 28 is greater than an inclination angle $\theta 2$ of the base end-side inclined part 32 relative to the central axis O ($\theta 1 > \theta 2$). A tip-side opening 34 of the nozzle 28 opens towards the tip-side inclined part 31. In the example, the inclination angle $\theta 1$ of the tip-side inclined part 31 is regulated to 30°. However, the inclination angle $\theta 1$ may be regulated to a range of 20° to 40°, preferably, a range of 25° to 35°. In the example, the inclined part 30 is configured by the tip-side inclined part 31 and the base end-side inclined part 32 but may also be configured by one inclined surface.

Subsequently, an operation of applying the grease to the worm wheel teeth 11 of the shaft-mounted worm wheel 9 by the grease application device of the example is described. The grease application operation to be described below is performed in some processes of a line for automatically assembling a worm-type reducer, for example. In the example, as the grease, urea-based grease of which a worked penetration is about 220 to 280 is used. However, a variety of other greases can also be used.

First, the end portion (a lower end portion in FIG. 1) of the shaft member 21 of the shaft-mounted worm wheel 9 is fixed to the gripping part 20 of the chuck 19 configuring the drive unit 12 by a conveyor device (not shown).

Then, the servo motor 17 configuring the drive unit 12 is driven to rotate the shaft-mounted worm wheel 9 with a predetermined number of rotations (rotating speed). The rotation states (a phase, the number of rotations and the like) of the shaft-mounted worm wheel 9 are detected from information of an encoder provided for the servo motor 17.

Then, at a state where the rotating speed of the shaft-mounted worm wheel 9 detected on the basis of the encoder information is constant, the first electromagnetic valve 25 is switched to the ON state, so that the continuous flow valve 15 is switched to the ON state (operating state).

Also, the second electromagnetic valve 29 is switched to the ON state simultaneously with or slightly later (about 0.1 second) than the switching of the first electromagnetic valve 25 to the ON state, so that the opening and closing valve 27 is set to the ON state (release state). Preferably, the second electromagnetic valve 29 is switched to the ON in a state where the pressure in the hose for grease 22c is high. In the example, the second electromagnetic valve 29 is switched to the ON state simultaneously with or slightly later than the switching of the first electromagnetic valve 25 to the ON state. However, the second electromagnetic valve 29 may be switched to the ON state after checking that the piston configuring the continuous flow valve 15 has started to advance on the basis of the information detected by the moving start detection function. When this configuration is adopted, the second electromagnetic valve 29 may be switched to the ON state simultaneously with or later than the detection of the advancing of the piston by the moving start detection function by predetermined time. According to this configuration, when there is a time lag after the first electromagnetic valve 25 is switched to the ON state until the piston of the continuous flow valve 15 starts to advance, the timing at which the second electromagnetic valve 29 is to be switched to the ON state (the opening and closing valve 27 becomes ON) becomes earlier, so that it is possible to prevent the pressure in the hose for grease 22c from being lowered.

As described above, when the continuous flow valve 15 is switched to the ON state, the air is supplied to the cylinder for air configuring the continuous flow valve 15, so that the piston configuring the continuous flow valve 15 starts to advance. As the piston advances, the grease delivered from the continuous flow valve 15 passes through the opening and closing valve 27, flows out of the tip-side opening 34 of the nozzle 28, as a fluid of liquid or gel phase, and is then applied to the worm wheel teeth 11 of the shaft-mounted worm wheel 9. The advancing speed of the piston is adjusted to a predetermined speed by adjusting the flow rate, the flow velocity and the like of the air supplied from the speed regulation valve 26 to predetermined values.

Also, the advancing speed of the piston and the rotating speed of the shaft-mounted worm wheel 9 are adjusted so that a required time period (an operating time period of the continuous flow valve 15) after the piston starts to advance (the first electromagnetic valve 25 is switched to the ON state) until the piston stops (the first electromagnetic valve 25 is switched to the OFF state) and a time period (a workpiece rotation time period) for which the shaft-mounted worm wheel 9 rotates one revolution with respect to the nozzle 28 are the same. That is, the application of the greases is ended at a point of time at which the shaft-mounted worm wheel 9 has rotated one revolution with respect to the nozzle 28. In the example, a controller (not shown) is provided so as to make the piston operating time period and the workpiece rotation time period be the same. As a method of regulating the piston operating time period and the workpiece rotation time period to be the same, a variety of methods including an electrical control method and a mechanically synchronizing method may be adopted.

In the example, the tip-side inclined part 31 of the nozzle 28 is provided to closely face a position at which a tangential line β of the tooth tip circle a of the shaft-mounted worm wheel 9 is the same as the inclination angle θ1 of the tip-side inclined part 31 relative to the central axis O of the base part 33 of the nozzle 28. That is, the nozzle 28 is mounted so that an inclination direction of the inclined surface of the tip-side inclined part 31 is parallel with a tangential direction of the tooth tip circle passing tooth tips (tip portions of convex portions) of the worm wheel 9. In the example, a distance L between the tip-side inclined part 31 and the tooth tip circle of the worm wheel teeth 11 of the shaft-mounted worm wheel 9 is regulated to 2 mm. However, the distance L can be regulated to a range of 1 mm to 3 mm, preferably, a range of 1.5 mm to 2.5 mm. In this way, the tip-side inclined part 31 (the tip-side opening 34) of the nozzle 28 inclined at a predetermined angle is made to closely face the worm wheel teeth 11 of the shaft-mounted worm wheel 9, as described above, so that it is possible not only to simply apply (attach) the grease, which is a fluid of liquid or gel phase discharged from the tip-side opening 34, to the worm wheel teeth 11 but also to fill the attached grease while pushing the grease into concave portions of the worm wheel teeth 11 (bottom portions of teeth) by the tip-side inclined part 31.

As described above, after applying the grease only while the shaft-mounted worm wheel 9 rotates one revolution with respect to the nozzle 28, the first and second electromagnetic valves 25, 29 are switched to the OFF state, so that the piston is retreated and the driving of the servo motor 17 is stopped to reduce the rotation of the shaft-mounted worm wheel 9. Thereafter, after checking that the rotation of the shaft-mounted worm wheel 9 has stopped on the basis of the encoder information of the servo motor 17, the shaft-mounted worm wheel 9 is conveyed to a next processor by the conveyor device.

In the example configured as described above, the shape of the nozzle 28 is improved and the arrangement aspect of the nozzle to the shaft-mounted worm wheel 9 is regulated as described above. While the shaft-mounted worm wheel 9 rotates one revolution, it is possible to fill the liquid grease while pushing the grease into the concave portions of the worm wheel teeth 11 of the shaft-mounted worm wheel 9 (the bottom portions of the teeth) by the nozzle 28. For this reason, it is possible to apply a sufficient amount of the grease to the worm wheel teeth 11 of the shaft-mounted worm wheel 9 in a short time.

Then, the rotation position of the worm wheel 9 is detected, so that it is possible to adjust an amount of the grease to be applied to the rotation position, in correspondence to the detected rotation position of the worm wheel 9.

INDUSTRIAL APPLICABILITY

According to the grease application method and the grease application device of the present invention, it is possible to apply the grease not only to the worm wheel but also to a variety of gear members having a concave-convex part formed on an inner or outer peripheral surface thereof.

Also, when implementing the grease application method and the grease application device of the present invention, the opening and closing valve configuring the grease application device may be omitted.

Also, when implementing the grease application method and the grease application device of the present invention, if the air to be supplied to the continuous flow valve can be stably secured without using the air tank, the air tank may be omitted.

Also, in the above embodiment, the operating time period of the continuous flow valve and the workpiece rotation time period are regulated to be the same by the controller. However, instead of the continuous flow valve and the speed regulation valve, a continuous flow valve configured to drive by a screw mechanism, such as an electric gear-type continuous flow valve (for example, a mono pump (registered trademark), may also be adopted.

Also, in the above embodiment, the member to be applied is enabled to rotate at a constant speed and the flow rate of the grease to be discharged from the nozzle to the member to be applied is constant. However, it may also be possible to apply the grease while changing the rotating speed of the member to be applied, at a state where the flow rate of the grease to be discharged from the nozzle is maintained to be constant. Specifically, while detecting a phase of the member to be applied, the rotating speed of the workpiece is slowed down when the opening of the nozzle faces the concave portions (tooth bottom surfaces of the worm wheel teeth) of the concave-convex part (the worm wheel teeth) of the member to be applied (the worm wheel). According to this configuration, it is possible to apply the grease while filling the grease into the concave portions of the concave-convex part of the workpiece.

The present invention is based on a Japanese Patent Application No. 2015-39863 filed on Mar. 2, 2015, which is herein incorporated by reference.

DESCRIPTION OF REFERENCE NUMERALS

1a: grease application device
9: shaft-mounted worm wheel
10: worm wheel
11: worm wheel teeth
12: drive unit
16: grease application unit
17: servo motor
28: nozzle
30: inclined part
31: tip-side inclined part
32: base end-side inclined part
34: tip-side opening

The invention claimed is:
1. A grease application device comprising:
a drive unit configured to rotatively drive a member to be applied, and
a nozzle having an opening arranged close to a concave-convex part formed on a circumferential surface of the member to be applied, and configured to apply grease which is discharged from the opening to the concave-convex part,
wherein the grease is applied from the nozzle to the member to be applied, as a fluid of liquid or a fluid of gel phase,
wherein the nozzle is provided to apply the grease to the concave-convex part while filling the grease into concave portions of the concave-convex part so that the grease is pushed into the concave portions;
wherein a tip portion of the nozzle is formed with an inclined surface inclined relative to a central axis of the nozzle at an acute angle,
wherein the opening of the nozzle is open towards the inclined surface, and wherein the grease is applied at a state where the opening of the nozzle closely faces the concave-convex part.

2. The grease application device according to claim 1 comprising a function of ending an application of the grease at a point of time at which the member to be applied has rotated one revolution with respect to the nozzle after starting the application of the grease to the member to be applied.

3. The grease application device according to claim 1 comprising:
 a detection function of detecting a rotation position of the member to be applied, and
 a function of adjusting an amount of the grease to be applied in correspondence to the rotation position of the member to be applied detected by the detection function.

4. A grease application method of while rotating a member to be applied having a concave-convex part formed on a circumferential surface thereof, applying grease, which is discharged from an opening of a nozzle arranged closed to the concave-convex part, to the concave-convex part,
 wherein a tip portion of the nozzle is formed with an inclined surface inclined relative to a central axis of the nozzle at an acute angle,
 wherein the opening of the nozzle is open towards the inclined surface, and
 wherein at a state where the opening closely faces the concave-convex part, the grease, which is a fluid of liquid or a fluid of gel phase, is applied to the concave-convex part by the nozzle while filling the grease into bottom portions of concave portions of the concave-convex part so that the grease is pushed into the concave portions.

5. The grease application method according to claim 4, wherein an application of the grease is ended at a point of time at which the member to be applied has rotated one revolution with respect to the nozzle after starting the application of the grease to the concave-convex part of the member to be applied.

6. The grease application method according to claim 4, wherein the nozzle is provided so that an inclination direction of the inclined surface is parallel with a tangential direction of a tooth tip circle passing tip portions of convex portions of the concave-convex part of the member to be applied.

7. The grease application method according to claim 4, wherein a rotation position of the member to be applied is detected after starting an application of the grease, and wherein an amount of the grease corresponding to the rotation position of the member to be applied is applied.

8. The grease application method according to claim 7, wherein the amount of the grease corresponding to the rotation position of the member to be applied is applied by changing a rotating speed of the member to be applied while constantly keeping an amount of the grease to be discharged from the opening of the nozzle.

9. The grease application method according to claim 8, wherein when the concave portions of the concave-convex part of the member to be applied face the opening of the nozzle, the grease is applied to be filled in the concave portions by slowing down the rotating speed of the member to be applied.

10. A method for manufacturing a worm-type reducer that has a worm and a worm wheel meshed with each other, the method comprising a step of applying the grease to teeth of the worm wheel by the grease application method according to claim 4.

11. A method for manufacturing an electric power steering device that has a worm-type reducer, the method comprising a step of manufacturing the worm-type reducer by the method according to claim 10.

12. A method for manufacturing an automobile that has an electric power steering device, the method comprising a step of manufacturing the electric power steering device by the method according to claim 11.

13. A method for manufacturing an industrial machine that has a gear, the method comprising a step of applying the grease to the gear by the grease application method according to claim 4.

* * * * *